Inventor
Grant E. Smith
By his Attorneys
Emery, Booth, Janney & Varney

April 12, 1932.   G. E. SMITH   1,853,583
WHEEL AND METHOD OF MAKING THE SAME
Filed Dec. 27, 1928   2 Sheets-Sheet 2
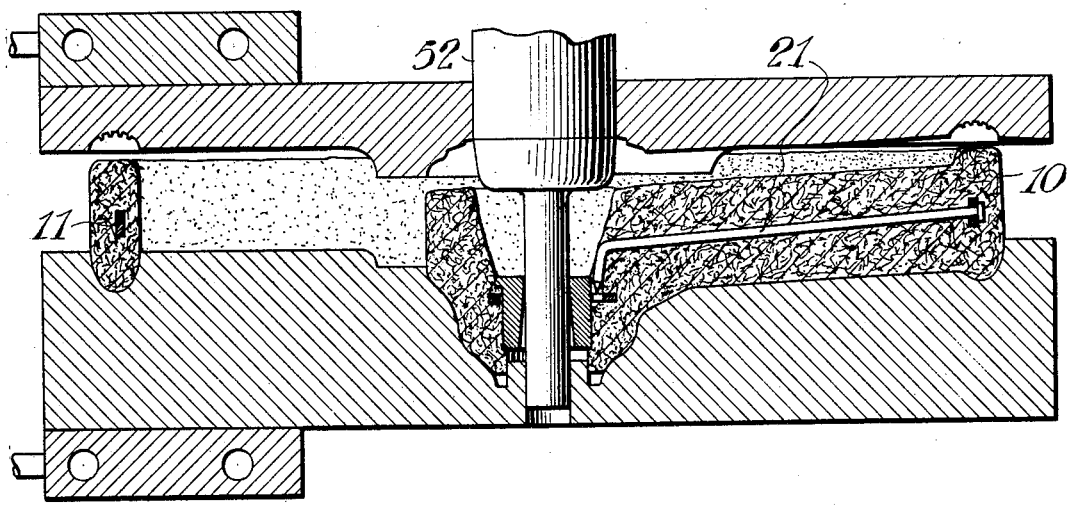
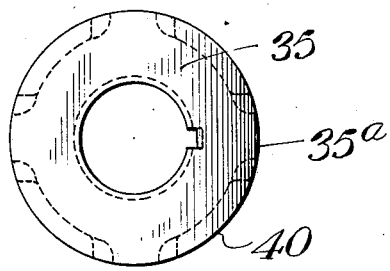
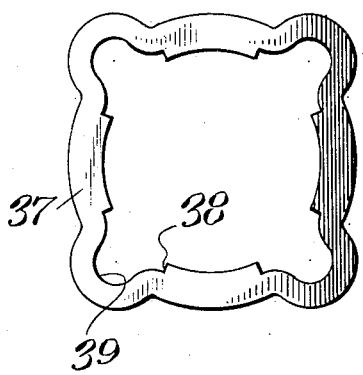
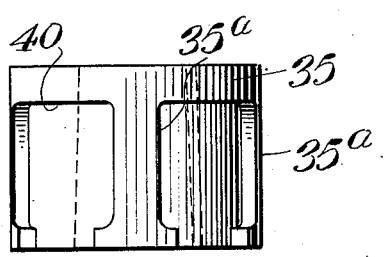
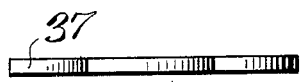
Inventor
Grant E. Smith
By his Attorneys
Emery, Booth, Janney & Varney Patented Apr. 12, 1932

1,853,583

UNITED STATES PATENT OFFICE

GRANT E. SMITH, OF POUGHKEEPSIE, NEW YORK, ASSIGNOR TO POUVAILSMITH CORPORATION, OF POUGHKEEPSIE, NEW YORK, A CORPORATION OF NEW YORK

WHEEL AND METHOD OF MAKING THE SAME

Application filed December 27, 1928. Serial No. 328,692.

The present invention relates to wheels and their manufacture and has for an object the provision of a molded wheel which will be strong, rigid, durable, comfortable to the hand and one which may be economically and expeditiously manufactured. Inasmuch as the invention has been developed in connection with the manufacture of steering wheels for automobiles, such an embodiment has been selected for illustration and description herein.

The invention concerns the manufacture of integrally molded wheels provided with reinforcement for the various portions thereof. I have found that a wheel of proper strength, neatness and other desired qualities may be successfully made of very inexpensive materials and at a correspondingly low cost for labor if the elements going to make up the wheel are judiciously designed and selected. For example, a wheel composed of a rim, spokes and a hub may be made principally of various moldable materials and reinforced by skeleton members which before molding are merely assembled loosely with each other. This permits the use of parts which require no special operations in their manufacture but which on the other hand may be chosen from articles of everyday use made in large quantities and at a price which may be only a half or a third of the price which would be incurred if all parts and materials had to be especially made and prepared.

In order to furnish the wheel with the desired strength and rigidity with the optimum size and outline I have found it expedient to include in the wheel certain reinforcing elements such as a bushing in the hub, rods in the spokes, and a ring in the rim. These elements are suitably associated or connected in the finished wheel so as to provide good connections between the several parts of the wheel as well as to serve as skeleton or base members to strengthen these parts in themselves.

The wheel illustrated is cupped on the upper side at the center for the reception of mechanisms or parts associated with the wheel. Preferably this cupped opening is disposed at the inner ends of the spokes and a hub extension is formed on the lower side of the spokes to take the bushing employed for attaching the wheel to a torque shaft. With this construction there is a somewhat weakened portion which connects the spokes to the hub extension. The reinforcing elements herein provided materially strengthen this section and by their shape and disposition transmit strains from the spokes directly to the hub bushing.

The enumerated and further objects of the invention will be best understood from the description of the illustrative embodiment thereof shown in the accompanying drawings, in which:

Figure 3 is a view similar to Figure 2 but showing the parts as they would appear in a mold prior to being molded;

Figures 4 and 5 are detail views of a bushing; and

Figures 6 and 7 are detail views of a collar employed.

Figure 1:
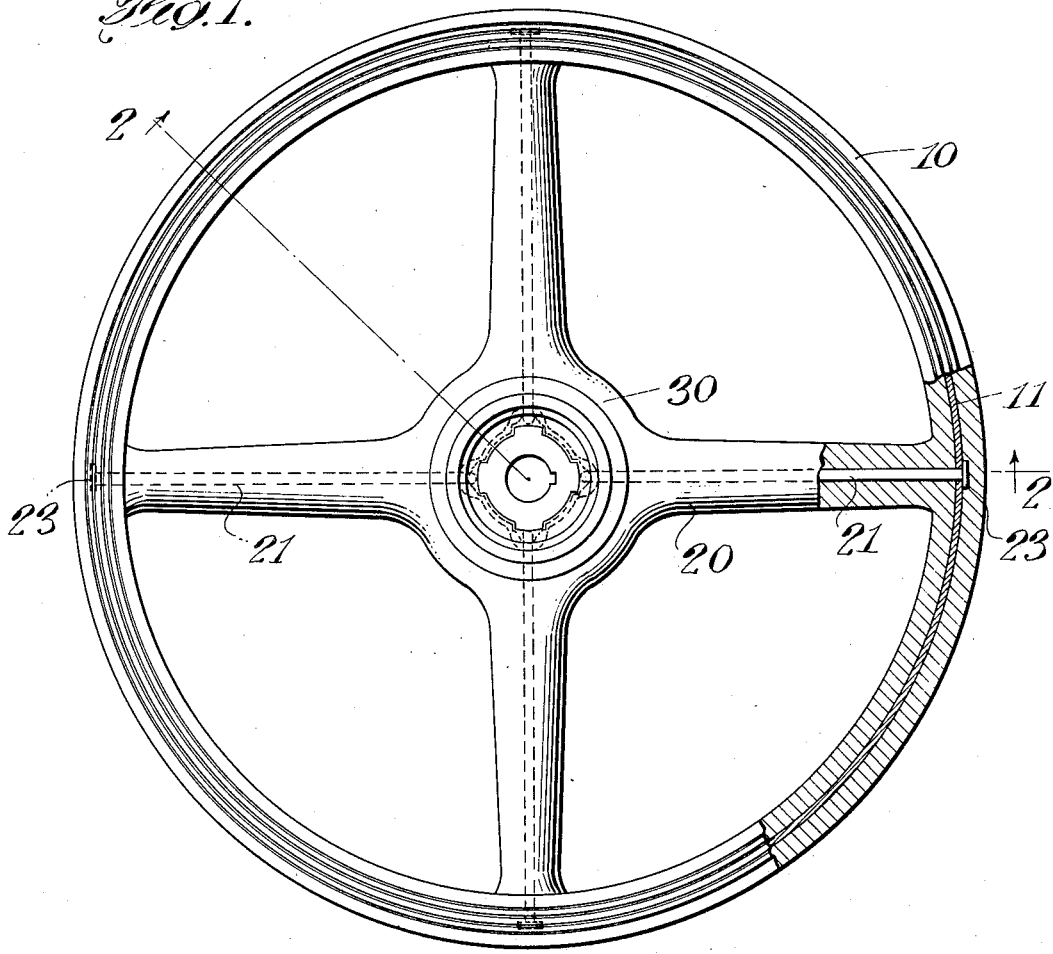
Figure 1 is a top plan view of the finished wheel.
Figure 2:
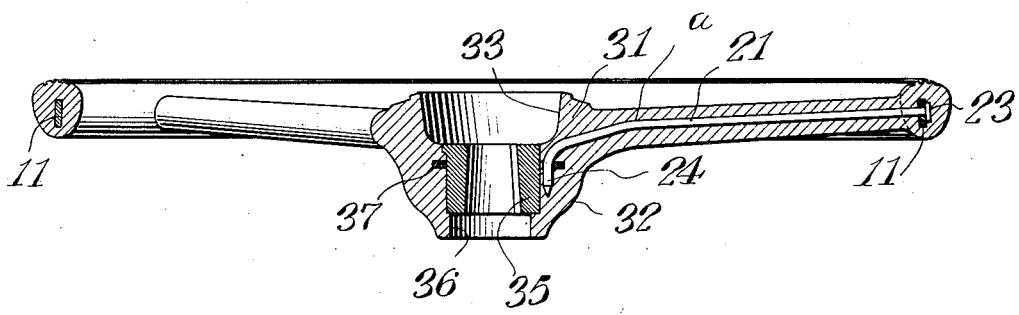
Figure 2 is an axial section taken on the line 2—2 of Figure 1.

The finished wheel, as shown in Figures 1 and 2 comprises a rim 10, spokes 20, and a hub 30, the hub including a body portion 31 embracing the inner ends of the spokes and an extension 32 axially offset with respect to the inner ends of the spokes. The extension 32 is provided with a bushing 35, preferably of metal, for securing the wheel to a shaft,— for example, the steering shaft of an automobile.

On its upper side the wheel is formed with an enlarged bore or recess 33 for the reception of parts appurtenant to the wheel. As illustrated, the bore 33 extends into the hub approximately to the lower edge of the spokes. There may also be an enlarged bore 36 formed in the hub extension 32 below the bushing 35 for the reception of other appurtenant parts, such for example, as the upper end of a tube or steering column surrounding the steering shaft.

A metal reinforcing member 21 extends throughout the length of each spoke, being embedded as a core within the spoke, and at its outer end beyond the end of the spoke is provided with an enlargement 23 for securing it within the rim to prevent separation of the rim and spoke.

In order to strengthen the rim and aid in joining it securely to the spokes, a reinforcing ring or band 11 is buried in the rim and associated with the spoke reinforcing members 21. For example, the members 21 may pass through the band and have their heads 23 engaged behind the outer side of the band.

Toward its inner end the reinforcing member 21 is bent down from the line of the spoke so as to enter the hub extension. This bending commences at the point $a$ (Figure 2) and as may be observed by comparing Figures 2 and 3 is principally imparted by the compressing operation through the action of the plunger 52 employed to form the recess or enlarged bore 33.

Nearer its inner end the member 21 is provided with a more sharply bent portion 24 adapted to lie along the wall of the bushing and brace the arms thereupon. A collar 37 fits closely about but slidably upon the bushing 35 and is provided with notches 38 adapted to fit over the ribs 35$a$ formed on the exterior surface of the bushing. If desired the bushing may be formed with a flange 40 on its upper end to hold the collar in proper positon when the parts are assembled for molding.

The collar 37 is enlarged in the region of the spokes as at 39 to receive the shanks of the spoke reinforcing members and hold them in toward the bushing. As shown, the enlargements 39 are made at the same places in the collar as the notches 38 thereby forming enlarged openings at several places.

Referring to Figure 3 which shows the various portions of the wheel before molding, one method of making the wheel may be as follows: The moldable material for the lower portion of the wheel may be laid loosely in the mold or may be blanked out and then laid in the mold. The reinforcing members, which have previously been loosely assembled by threading the members 21 inward through holes in the rim ring 11 and passing the bent ends 24 through the collar 37 which has been slipped on the bushing 35, are next placed in position after which the remainder of the moldable material is placed in the mold, which is closed under high pressure. If desired separate partially formed blanks for the rim, spokes and hub may be used.

Various kinds of moldable material may be used. I have obtained good results with paper or other fibrous material impregnated or coated with a suitable phenolic condensation product. When such material is used heat as well as pressure is applied to the mold. For most moldable materials, in fact, both heat and high pressure will be employed.

The described assembly and method permit the use of simple parts and inexpensive materials in the wheel; provide rapid assembly; and when completed, a wheel which is smooth to the hand, of neat appearance, and rigid and strong as a unit. Such a wheel is braced to withstand severe strains either torsional, radial, or axial and especially will the wheel withstand heavy downward pressures upon its rim due to the vertical bracing of the spoke reinforcing members against the hub bushing.

A reinforcing wheel made according to this invention is particularly desirable in case of accidents since it will not readily break or pull apart but instead all of the parts will be held together even though the molded material may, on account of unusual severe stress, be fractured. The spokes will not separate from the hub due to the fact that the spoke reinforcing rod is engaged with parts connected to the hub bushing and the rim will not separate from the spokes due to the fact that the head of the reinforcing rod in the spokes is engaged behind the outer surface of the ring disposed in the rim.

It will be apparent that various changes and modifications may be made both in structure and method of manufacture of the wheel, the specific description being given solely for purposes of illustration.

What I claim is:

A steering wheel comprising a molded rim, hub and spokes, said hub being formed with a hub extension axially offset with respect to the inner ends of the spokes and a central bore including a counterbore in the region of the inner ends of the spokes, a bushing in the hub extension, a flange on the end of the bushing adjacent the spokes, longitudinal splines on the outer surface of said bushing, a collar fitting over said bushing below the flange thereof and provided with apertures corresponding in number and position to said spokes, an apertured metal ring in said rim, and metal reinforcing rods extending through said ring and spokes from the rim into the hub extension, said rods having an enlargement engaging the outer side of said ring and a bent portion at the other end entering the apertures of the collar and braced against the splines of the bushing.

In testimony whereof I have signed my name to this specification this 14th day of December, 1928.

GRANT E. SMITH.